United States Patent [19]

Tisue et al.

[11] 4,396,952
[45] Aug. 2, 1983

[54] FACSIMILE TRANSMISSION APPARATUS

[76] Inventors: James G. Tisue; M. Ann Tisue, both of 7 Morning Sun Ct., Mountain View, Calif. 94043

[21] Appl. No.: 280,496

[22] Filed: Jul. 6, 1981

[51] Int. Cl.$^3$ .......................... H04N 1/00; H04N 7/12
[52] U.S. Cl. .................................... 358/260; 358/133
[58] Field of Search ............... 358/260, 138, 133, 136, 358/261; 364/515

[56] References Cited

U.S. PATENT DOCUMENTS

| | | | |
|---|---|---|---|
| 3,974,325 | 8/1976 | Wilmer | 358/260 |
| 4,193,092 | 3/1980 | Stoffel | 358/260 |
| 4,291,339 | 9/1981 | Ogawa | 358/260 |
| 4,303,947 | 12/1981 | Stoffel | 358/260 |

Primary Examiner—Robert L. Griffin
Assistant Examiner—Edward L. Coles
Attorney, Agent, or Firm—Claude A. S. Hamrick

[57] ABSTRACT

Apparatus for evaluating, characterizing and transmitting facsimile data at an efficiency exceeding one transmission bit per elemental scan area but in such a manner as to avoid the drop-out of data which is relatively close in size to an elemental scan area. An illustrative embodiment of one form of the present invention includes an image scanner (50) for line-scanning a document (56) and developing a series of scan data corresponding to the data character of scanned elemental areas of each scanned line, a first storage device (52) for storing a line of scan data, a second storage device (53) for storing a line of previously characterized preceeding line pair data, interpolation logic (54) responsive to the scan data, adjacent scan data previously stored in the first storage device (52) and proceeding line pair data stored in the second storage device (53) and operative to develop present line pair data, and a data utilization device (55) for transmitting, recording or otherwise using the present line pair data.

24 Claims, 29 Drawing Figures

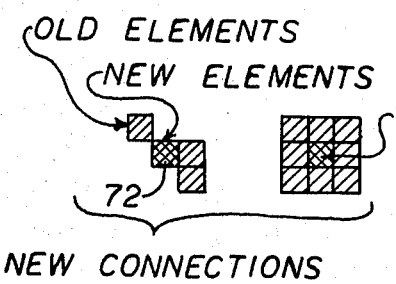
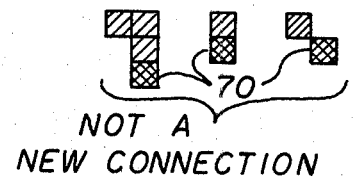
NEW CONNECTIONS
FIG. 8(A)
NOT A NEW CONNECTION
FIG. 8(B)
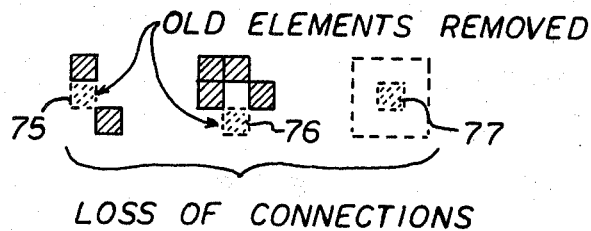
LOSS OF CONNECTIONS
FIG. 8(C)
NOT A LOSS OF CONNECTION
FIG. 8(D)
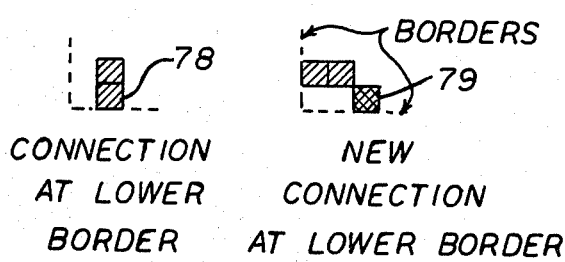
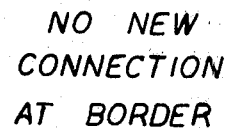
CONNECTION AT LOWER BORDER
FIG. 8(E)
NEW CONNECTION AT LOWER BORDER
FIG. 8(F)
NO NEW CONNECTION AT BORDER
FIG. 8(G)
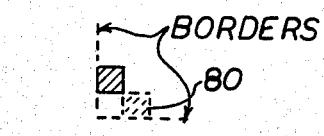
LOSS AT BORDER
FIG. 8(H)
NOT A LOSS AT BORDER
FIG. 8(I)

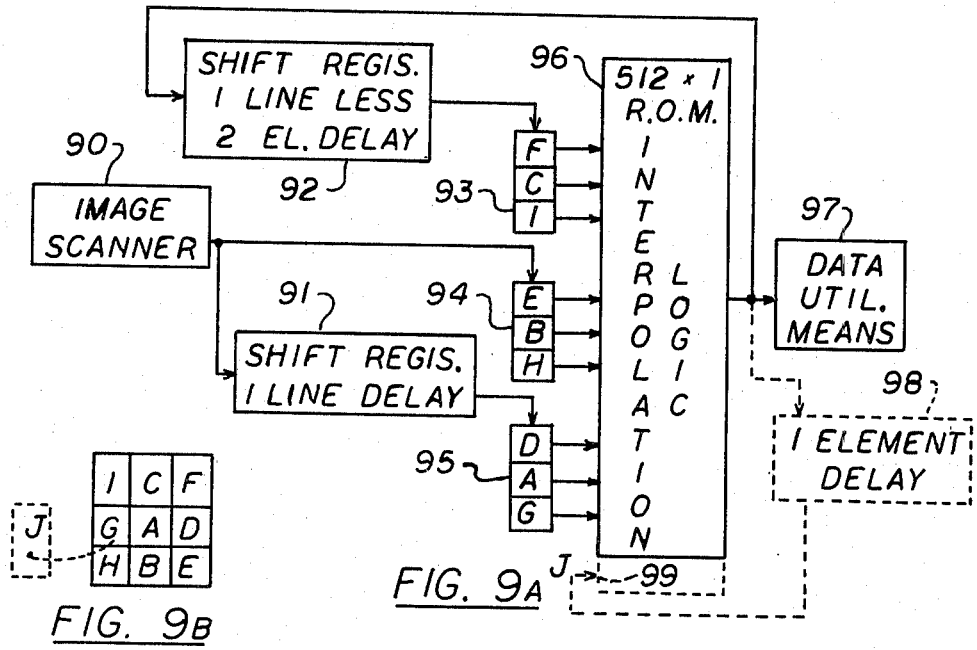
FIG. 9A
FIG. 9B
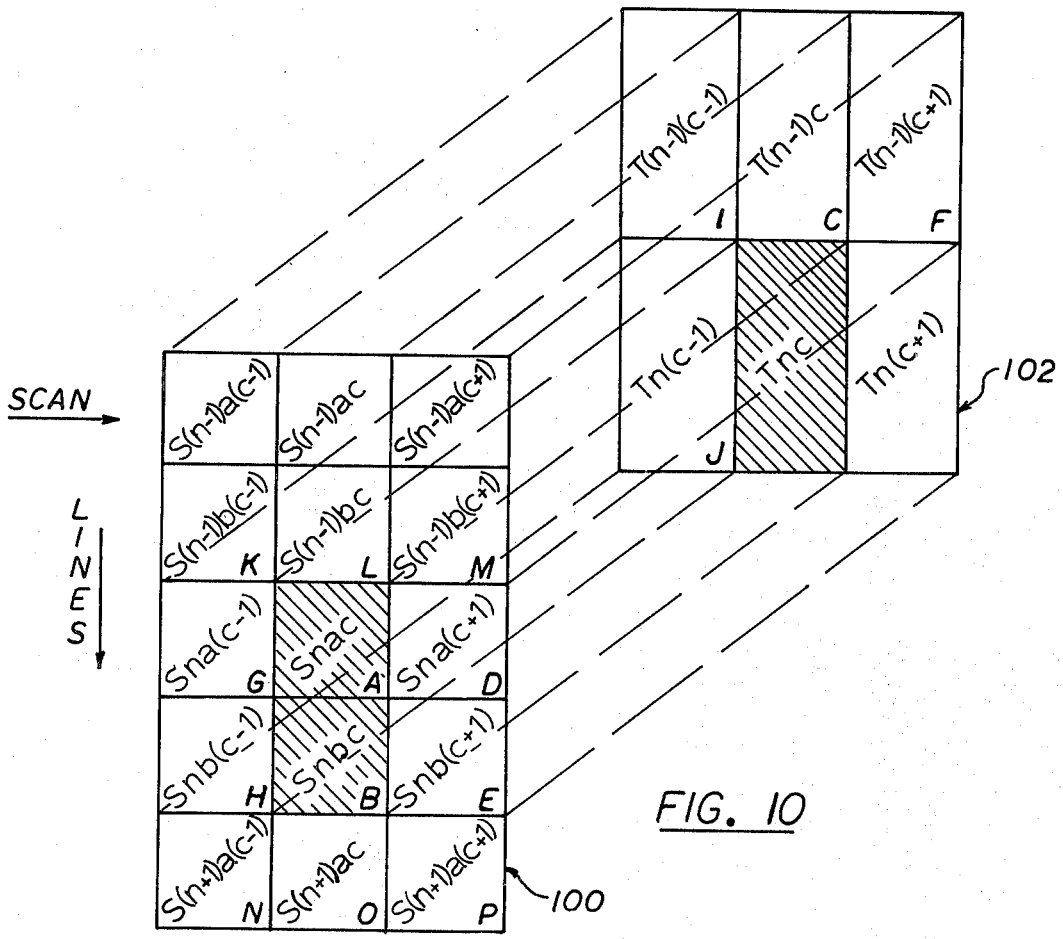
FIG. 10

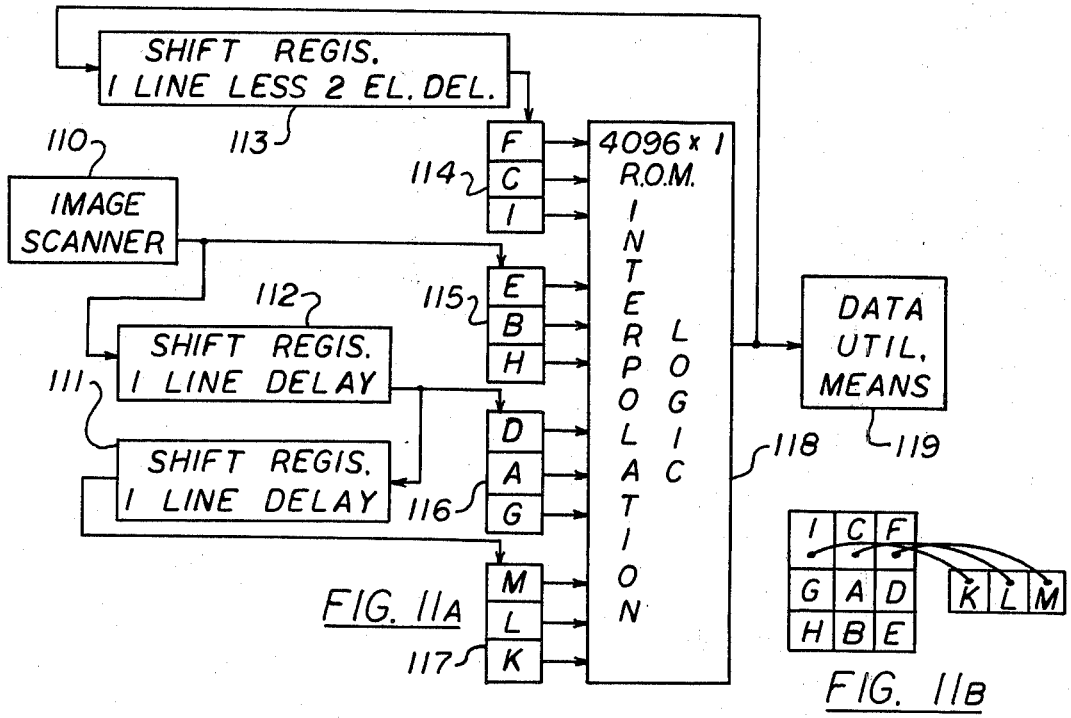
FIG. 11A
FIG. 11B
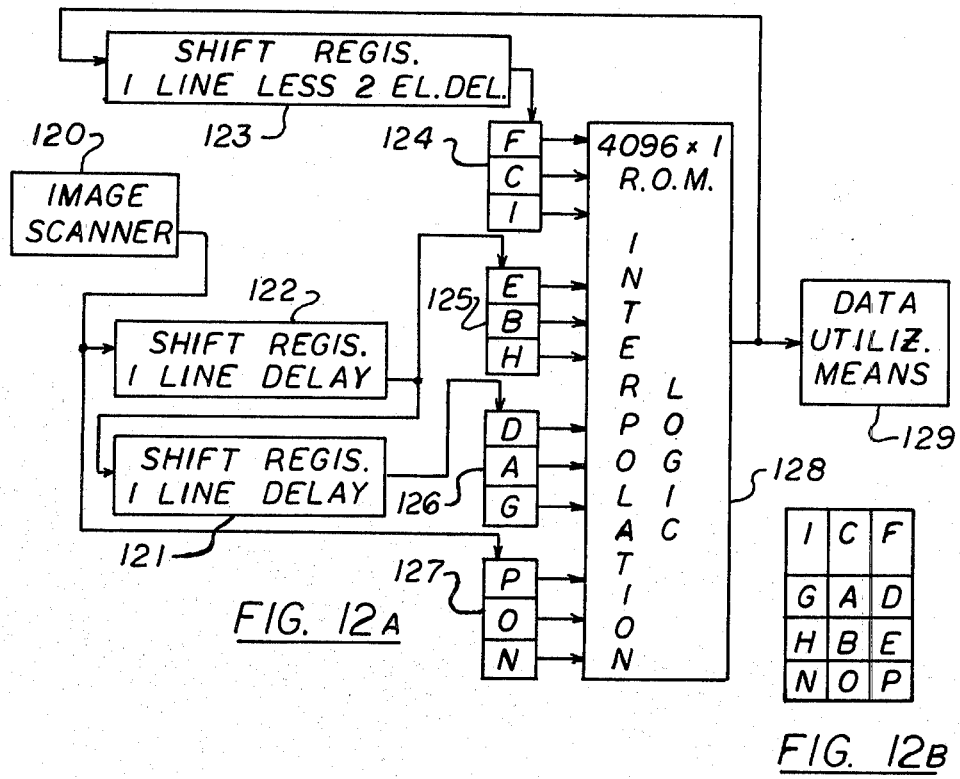
FIG. 12A
FIG. 12B

* USING THE RESULTS OF APPLYING THE SIMPLIFIED ALGORITHM ON SIDE ELEMENTS

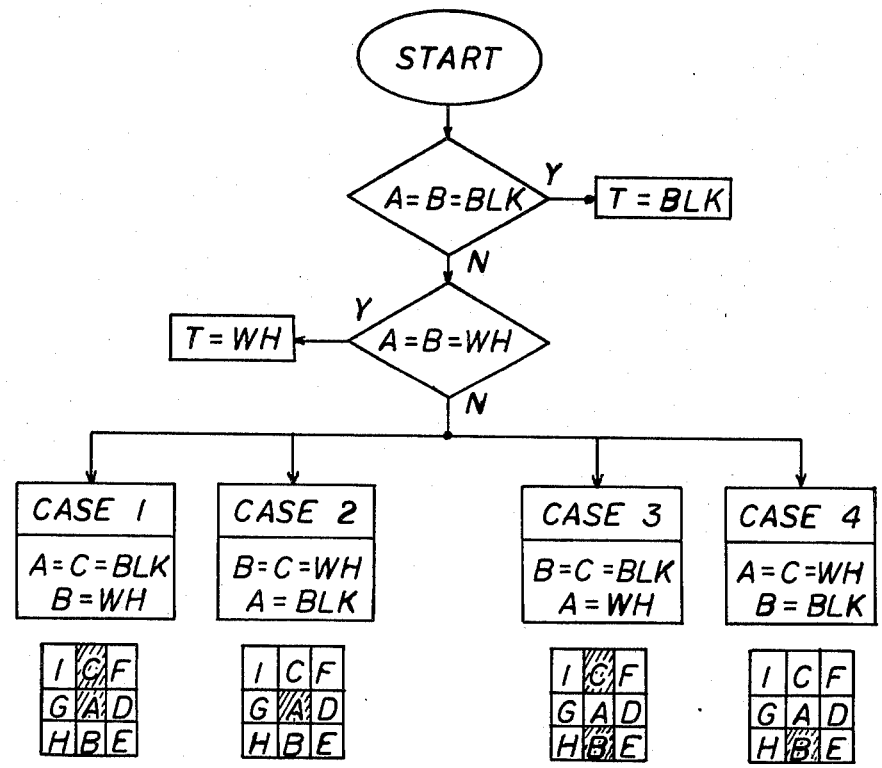
FIG. 14
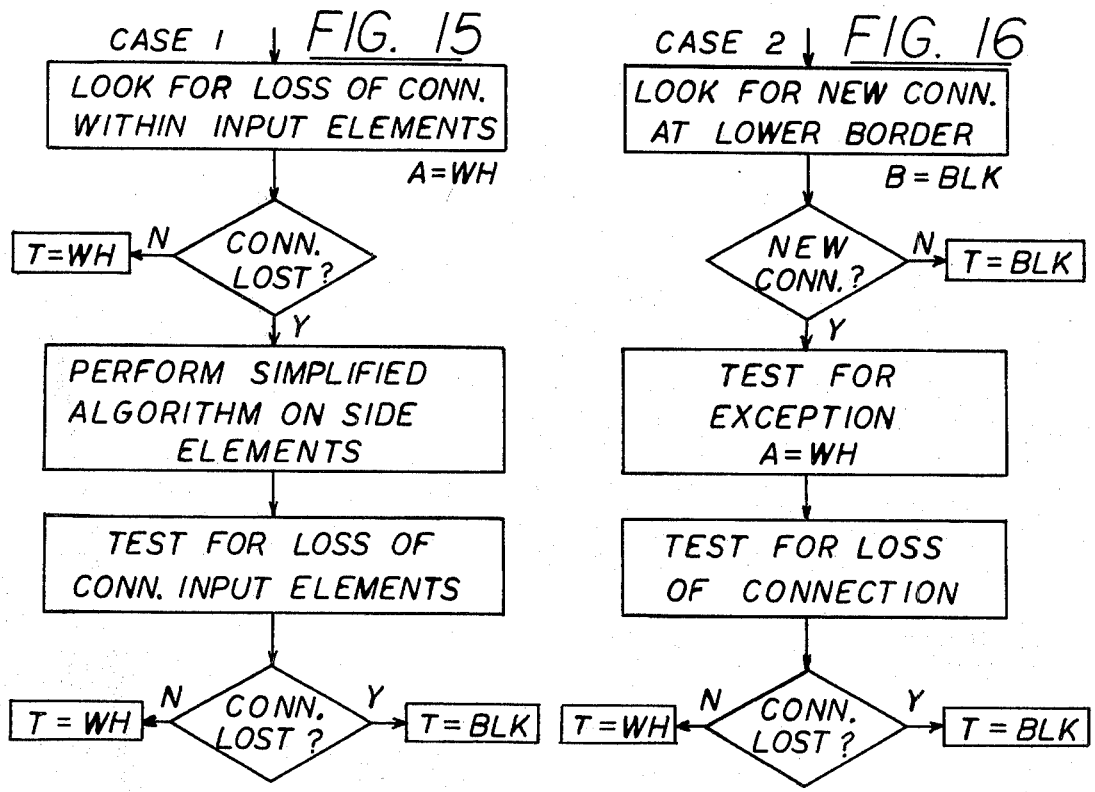

0
FACSIMILE TRANSMISSION APPARATUS

BACKGROUND OF THE PRESENT INVENTION

1. Field of the Invention

The present invention relates generally to facsimile transmission apparatus and more particularly to a novel method and apparatus for scanning, storing and transmitting data in a manner which provides accurate reproduction of data transmitted.

2. Description of the Prior Art

In scanning printed or pictorial information for developing data that can be transmitted for facsimile reproduction, finite elemental areas of the scanned surface are normally analyzed and characterized as being either black, white or some level of gray. In those systems wherein levels of gray are not provided for, the scanned elemental areas are usually identified as either a black area or a white area.

In order to improve the transmission and reproduction time of facsimile data, particularly those in which high resolution is not required, it is often desirable to reduce the amount of data transmitted without destroying legibility or other usefulness. However, merely sampling at lower spacial rates destroys image information at the resolution limit. For example, where all areas containing a single bit of data to be reproduced are substantially larger than an elemental scan area, reproduction inaccuracies are rare. However, where areas of white (or black) data equal to or smaller in size than an elemental scan area, or which have a vertical dimension equal to or less than that of a scan line are surrounded by black (or white) data, and a boundary between adjacent scan lines happens to straddle one of these areas, the data representing such areas will often be characterized in a manner which will result in an unaccurate facsimile reproduction.

This problem is illustrated in FIG. 1 in which the shade area 10 represents the black image of a letter "e" including an opening or white area 12 surrounded by the solid or black areas of the letter, the size of the area 12 being small compared to the scan line width W. Where elemental scan areas S are designated as black when 50% or more of the area is black, and are otherwise designated white, areas such as 12 are likely to be straddled by scan lines such that data corresponding to the opening is lost entirely. This result is illustrated by the shaded area 14.

A similar problem arises where a reduction in transmitted data is accomplished by transmitting only every other line of scanned data and with the reproduction equipment repeating each received line twice. As illustrated in FIG. 2, even though the open area 20 in question is larger than a scan element S (but smaller in the vertical dimension than two scan elements) the net result shown at 22 is essentially the same as that shown at 14 in FIG. 1.

One method of reducing the amount of data transmitted is to serially transmit data corresponding to every other element on adjacent scan lines so that the data transmitted corresponds to a zig zag pattern across the document. Another approach is to transmit each line of data in a skipped element pattern. In both cases, simple logic at the reproducing end of the transmission link interpolates the missing elements. These methods produce fairly good results but have two major drawbacks. The first is that if the data is being run length encoded, the number of data transitions is doubled for horizontal edges in the first example and for vertical edges in the second example. Another drawback is that full horizontal and vertical resolution must be printed.

SUMMARY OF THE PRESENT INVENTION

It is therefore an objective of the present invention to provide a method and apparatus for evaluating, characterizing and transmitting facsimile data at an efficiency exceeding one transmission bit per elemental scan area but in such a manner as to avoid the drop-out of data which is relatively close in size to an elemental scan area.

Another objective of the present invention is to provide a method and apparatus for developing and transmitting facsimile data corresponding to at least two elemental scan areas, the data characterization of which is determined at least in part by the character of adjacent elemental scan areas.

Still another objective of the present invention is to provide a method and apparatus for developing and transmitting facsimile data corresponding to at least two elemental scan areas the data characterization of which is determined not only by the character of adjacent elemental scan areas but also by the previous characterization of an adjacent pair of elemental scan areas.

Briefly, an illustrative embodiment of one form of the present invention includes an image scanner for line-scanning a document and developing a series of scan data corresponding to the data character of scanned elemental areas of each scanned line, a first storage device for storing a line of scan data, a second storage device for storing a line of previously characterized preceeding line pair data, interpolation logic responsive to the scan data, adjacent scan data previously stored in the first storage device and proceeding line pair data stored in the second storage device and operative to develop present line pair data, and a data utilization device for transmitting, recording or otherwise using the present line pair data.

Alternative embodiments include additional storage devices and more complex encoding logic for developing present line pair data based upon previously characterized adjacent scan data, later characterized adjacent scan data and previously characterized line pair data.

An important advantage of the present invention is that facsimile data can be reduced in quantity and be more efficiently transmitted without loss of material quality.

Another advantage of the present invention is that means are provided for characterizing scan data based upon the characteristics of adjacent scan data with the result being a reduction in the probability of material data degradation upon subsequent reproduction.

These and other objects and advantages of the present invention will no doubt become apparent to those skilled in the art after a reading of the following description of preferred embodiments illustrated in the several figures of the drawing.

IN THE DRAWING

Figure 5:
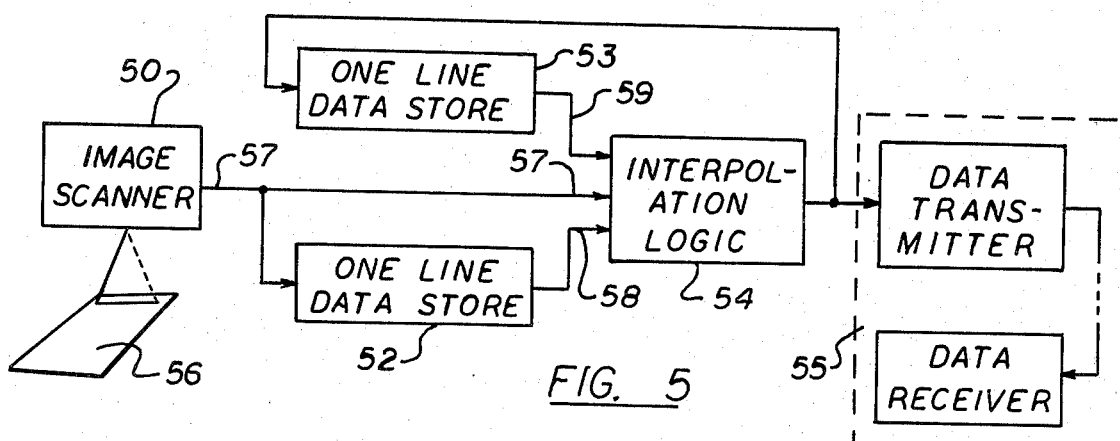
FIG. 5 is a block diagram illustrating a simplified implementation of a facsimile transmission system in accordance with the present invention.

FIGS. 6, 7(a), 7(b) and 8(a)-8(i) are pictorial diagrams used to explain operation of the present invention;

FIGS. 9a and 9b illustrate in more detail the simplified embodiment shown in FIG. 5;

FIG. 10 is a diagram used to pictorially illustrate and define certain terms used in the detailed disclosure;

FIGS. 11a and 11b, and 12a and 12b illustrate alternative embodiments in accordance with the present invention; and FIGS. 13-18 are flow charts illustrating methods of operation of the present invention.

DETAILED DESCRIPTION OF THE PREFERRED EMBODIMENTS

Figures 3, 4:
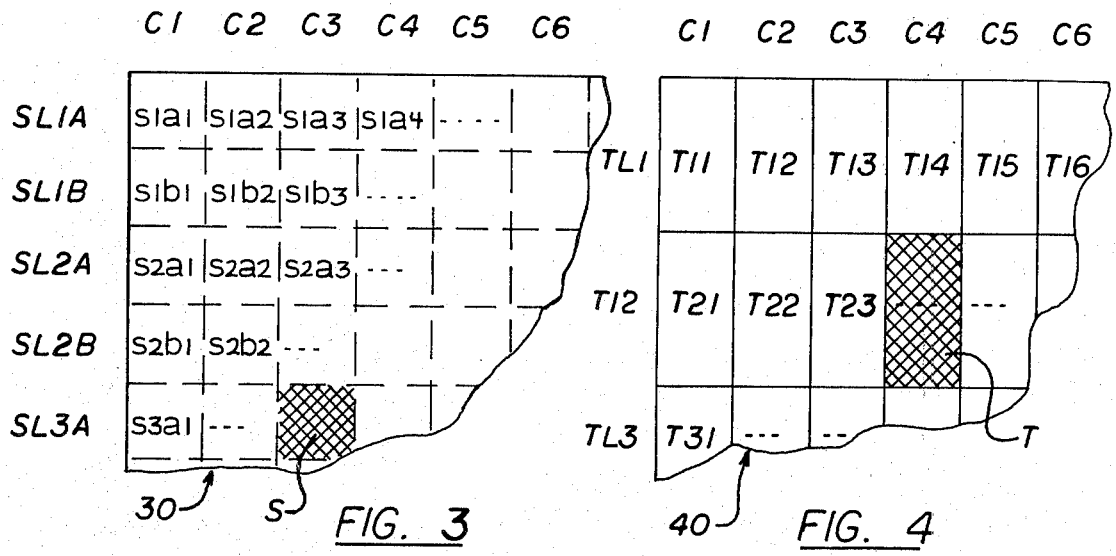
FIGS. 3 and 4 are diagrams used to define terms used in the detailed disclosure of the present invention.

Referring now to FIG. 3 of the drawing, one corner of a document to be scanned is illustrated at 30 and is subdivided into rectangular picture elements (pixels) or elemental scan areas S arrayed in rows or scan lines "SL" and columns "C". Scan lines are for simplicity of discussion numbered consecutively in pairs of lines designated SLna and SLnb where each elemental area is designated Snac or Snbc where "n" is the line pair number, "a" and "b" indicate the respective lines of the pair, and "c" indicates the column of the elemental area.

In FIG. 4 the same corner of the document is illustrated at 40 except that instead of indicating elemental areas S, transmit data T corresponding to the elemental area pairs (pixel pairs) shown in FIG. 3 are designated Tnc, where n is the transmit row and "c" is the transmit column.

In accordance with the present invention, the data character of each elemental area S is characterized as being black if more than 50% of its area is black—otherwise it is characterized as being white. And further in accordance with the present invention, each pair of vertically adjacent elemental areas is characterized as being either black or white on a basis to be described in detail below and is represented as a single bit of data T which may be transmitted as representative of the elemental area pair.

If both elemental areas of a particular pair are either white or black, the decision as to the characterization is straight forward. However, if the two elemental areas are of different character, the pair will be characterized as having the data state which would make the transmitted data different from the previously transmitted data corresponding to the elemental area pair directly above it. This has the effect of (a) pulling discrete data areas being scanned up the page allowing for more vertical transitions in the scanned symbol should there be several vertical transitions in a row less than a line pair high and (c) maintaining vertical transitions if they should be missed by one of the scan lines.

In FIG. 5 a simplified implementation of the present invention is shown in a block diagramatic representation including an image scanner 50, a pair of one line data storage devices 52 and 53, an interpolation logic unit 54, and a data utilization means 55 such as might include a local transmitter and remote receiver. Scanner 50 is a conventional line scanning device capable of scanning the surface of a document 56 on a line-by-line basis and developing a binary one-bit output on line 57 for each elemental area scanned, such output indicating whether the scanned area is black or white.

Data storage device 52 is a shift register or similar device which is capable of storing in serial fashion all the bits of data output by scanner 50 as it scans an entire line of document 56. During the scan of a subsequent line, data contained in device 52 is shifted bit-by-bit into input 58 of logic unit 54.

Data storage device 53 is a shift register having a bit capacity compared to that of register 52 such that it functions to store each bit of binary data output by logic unit 54 and to output the transmit bit corresponding to the pixel pair disposed immediately above that bit. In other words, during every other scan line, scanner 50 will input "b" line data to logic unit 54 over line 57, storage device 52 will input "a" line data to logic unit 54 at input 58 and storage device 53 will input at 59 interpolated transmit data "T" corresponding to the two bits of data representing the two elemental areas lying immediately above the "a" and "b" elements presently being evaluated.

Logic unit 54 is typically a read only memory (ROM) device programmed to output a single binary bit corresponding to a particular set of three binary bits input at its terminals 57, 58 and 59. In accordance with the present invention, the algorithm implemented by the illustrated system in order to determine the transmit data bits T may be represented by the algorithmic expression $$Tnc = Snac \cdot Snbc + \overline{T(n-1)c} \cdot [Snac \cdot \overline{Snbc} + \overline{Snac} \cdot Snbc]$$

where "n" is the number assigned to the scan line pair and corresponding transmit data line, "c" is the column of the elemental area pair in question, "a" designates the first scan line in the scan line pair, "b" designates the second scan line in the scan line pair, where $\overline{Snbc}$ indicates that element $\overline{Snbc}$ was black and $\overline{Snbc}$ indicates that element Snbc was white.

Figure 6:
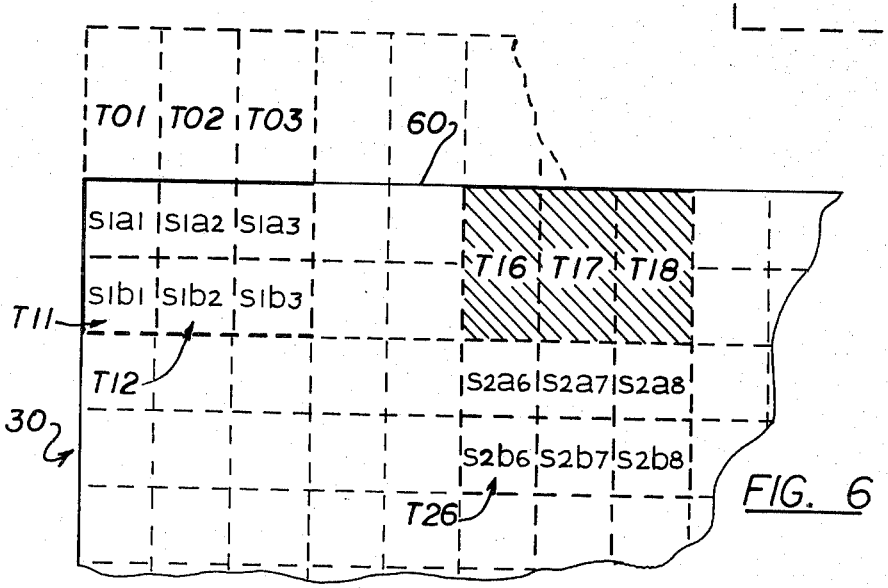
Figure 7A:
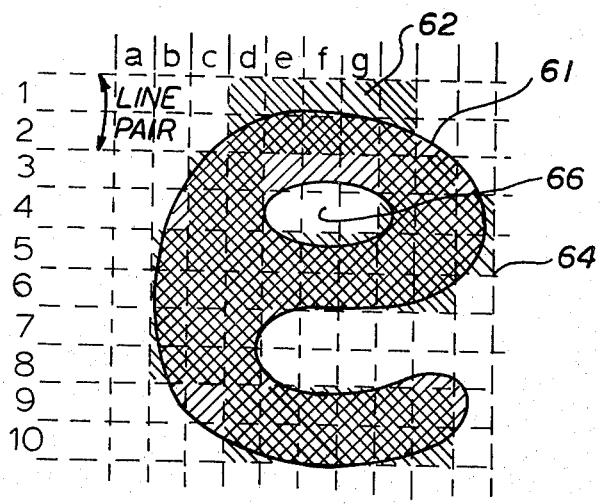
Figure 7B:
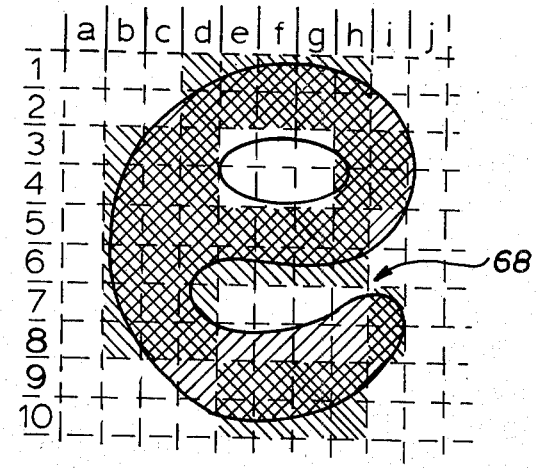

The application of this expression is illustrated in FIG. 6 which is essentially a continued repeat of the document corners shown in FIGS. 3 and 4. Since the algorithm requires values for T corresponding to areas above and outside of the document edge 60 in order to properly evaluate the scan data in scan lines S1a and S1b, these values will be arbitrarily designated white if the first several lines of data appear to be white. With this assumption it will be possible to substitute the values for T01, S1a1 and S1b1 into the above expression in order to determine the data state of T11. For example, as scanner 50 gets to element S1b2 it develops a characterizing data signal that will be input to logic unit 54 along with signals representing S1a2 (previously stored in register 52) and T02 (previously stored in register 53). In response to these signals logic unit 54 develops T12, etc. Similarly, the input to logic unit 54 of scan data pair S2a6 and S2b6, and transmit data T16 will yield the transmit data signal T26, etc.

Figure 2:
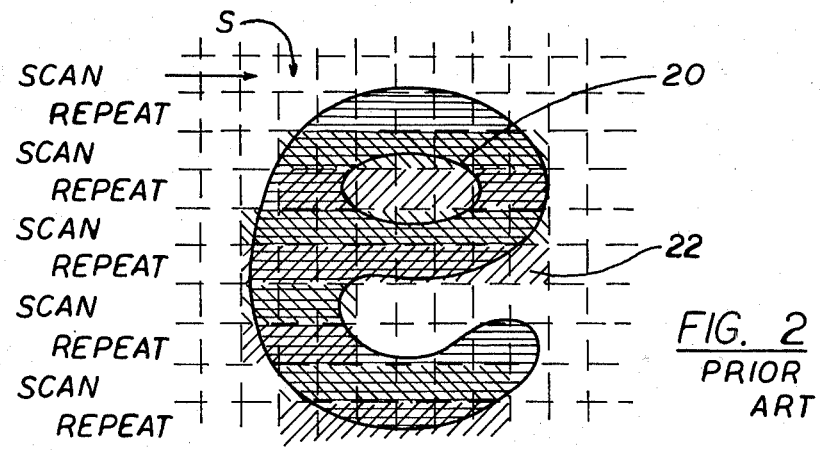

In FIG. 7(i a) of the drawing, the results of this approach are demonstrated. In this example, the shaded area 61 represents a solid, or black, image scanned, whereas the shaded area 62 represents the results interpolated according to the present invention. The dashed lines 64 designate the scanned elemental areas. In this example, run length compression data is increased by four transitions (as compared to the example illustrated in FIG. 2), the minimum necessary in this case to save the opening 66 in the "e".

Figure 1:
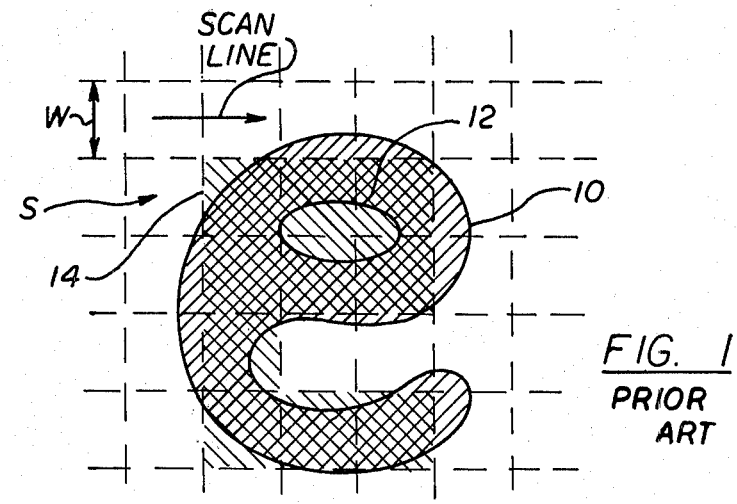
FIGS. 1 and 2 are pictorial diagrams illustrating facsimile transmission problems occuring in prior art systems.

Note that since elemental area 2d is more than 50% black it is characterized as black and even though elemental area 1d was white it is also characterized as black by the system algorithm because the transmit data bit lying immediately above it was white. The same holds true for the next four data pairs. However, note that where elemental area 4e is white and area 3e is black, both will be characterized as white since the areas 1e and 2e lying immediately above this pair were previously characterized as black, etc. The net result is that the "hole" 66 in the image 61 has been preserved in the transmitted image 62 in contradistinction to the transmitted images 14 and 22 of FIGS. 1 and 2, respectively.

This approach is ideal for run length encoding compression since run length bits are typically (1) cut in half if the number of lines is halved, or (2) reduced or increased by only a few percent if the number of elements along the line is halved or doubled, respectively. As illustrated by the circuit of FIG. 5, this implementation requires that only one line of transmitted data T and one line of scan data S be stored. This embodiment is referred to as the vertical algorithm.

Although the previously described simple embodiment (the vertical embodiment) is an improvement over the prior art, there are cases where further refinement is called for. For instance, note in the example illustrated in FIG. 7(b) where the phase of the "e" image relative to the scan line pairs has been changed slightly (as compared to that shown in FIG. 7(a)) even though all vertical transitions are preserved, a spurious connection has been made at 68 where one did not exist in the original. This tends to distort the transmitted image in an undesirable manner.

It has thus been found that legibility of small aphanumeric characters and the like will be moderately preserved, even if the shapes are severely distorted, so long as (a) no "white path" in the original is closed off to create a new "opening" and a new "black path", and (b) no "black path" is broken to form a "white path". A white path is defined as a connection between white areas which is a full element wide, and a black path is defined as an element wide connection or a point-to-point connection between two black areas.

The primary objective of the present invention is to reduce the amount of data which is transmitted without destroying the legibility or other usefulness of the reproduced data. Generally stated, the approach is to combine scanned picture elements in such a way as to produce transmissable signals that result in a minimum loss of original image shape even though it produces a reconfigured picture from fewer picture elements. The optimum combination is achieved by making comparisons with neighboring scanned elements in accordance with a predetermined set of decision making rules.

In accordance with these rules (see FIGS. 8(a)-8(i)) wherein the shaded squares represent old elements, the cross-hatched squares represent new elements, and the dashed spaces represent old elements removed. A black connection is said to exist if black elements contact each other (side as at 70 or corner as at 71) and a "new connection" is said to exist (1) where a new element causes two otherwise unconnected elements or groups of elements to become one group (as at 72), and (2) where a black element (73) fills a space surrounded by other elements; a "loss of connection" is said to exist (1) where removal of an element (75) causes a group of mutually connected elements to be split into two groups, (2) where the removal of a black element (76) changes a closed loop formation to an open loop formation of three or more elements, such that the white element is no longer surrounded, and (3) where a black element (77) previously surrounded by white elements is removed; a "connection at the lower border" is defined as meaning the case where two or more connected elements (78) touch the lower border of the input element cluster; a "new connection at the lower border" is the addition of one or more black elements (79) at the lower border when some connection was previously non-existent; and a "loss of connection at the lower border" is said to occur when the loss of an element (80) results in the loss of all connections to the lower border.

The "simplified algorithm at sides" is an attempt to include the effect of the probable changes to the elements at the sides when they are interpolated at a different time. "Probable" must be used in this definition because not all elements are available for that interpolation process. Basically, the simplified algorithm is the vertical algorithm modified to reject new connections and lost connections within the elements available.

One implementation of a practical system which avoids the phase related problem depicted in FIG. 8 is illustrated by the solid lines in FIG. 9a and is probably the simplest useful version. The dashed lines illustrate a modification which will be described below. In order to determine the data bit to be transmitted corresponding to a particular bit pair AB, this embodiment uses six bits of scanned data A, B, D, E, G and H, and 3 bits of transmitted "interpolated" data C, F and I representing data spacially located as illustrated in FIG. 9b.

For the illustrated input element structure (without input J), applying the simplified algorithm at the left side is to first apply the vertical algorithm to elements I, G and H. For those elements the algorithm is:

$$T = GH + \bar{I}(G\bar{H} + \bar{G}H)$$

This algorithm application may result in either element G or H changing from white to black or vice versa. That change is examined with respect to elements A, B and C for any new or broken connections, and should new or broken connections occur, an examination of the exception to the vertical algorithm is performed. Elements F, D and E are not involved because they are not adjacent to I, G and H. Further, the elements to the left of I, G and H are not involved since they are not known as inputs to the logic. Should element J exist in the input structure, it would be used directly as were elements G and H. A similar process is used for applying the simplified algorithm to the right side elements F, D and E.

The system shown in FIG. 9a includes an image scanner 90 of the type discussed above relative to the embodiment of FIG. 5, a one-line delay serial in-serial out shift register 91, a one-line less 2 element delay serial in-serial out shift register 92, three 3-bit serial in-parallel out shift registers 93, 94 and 95, a 512×1 ROM containing interpolation logic, and a data utilization means. The alphabetical letters shown in blocks 93-95 correspond to the spatial blocks of FIG. 9b, with H, B, E representing three consequtive bits from the scan line presently being scanned, G, A, D, representing three consequtive and immediately adjacent bits from the scan line previously scanned, and I, C, F, representing three consequtive and immediately adjacent bits of interpolated data from the last data line pair. Other more complex embodiments and their operational formats are illustrated in FIGS. 11a, 11b, 12a, and 12b.

As a further aid to understanding the relationships between the various blocks of FIGS. 9b, 11b and 12b reference is additionally made to FIG. 10 which is a more generalized and all inclusive diagram indicating at 100 each data block (scan area) surrounding the data block pair Snac and Snbc presently being investigated, and indicator 102 at the resulting transmit data blocks as they correspond to the several data block pairs. The letters A-P cross reference the various scan data blocks of FIG. 10 to those of FIGS. 9b, 11b, and 12b. Each of these diagrams may be thought of as multi-paned windows which can be moved across the scanned document in one pixel increments to identify each pixel pair AB and their surrounding pixel data and transmit data.

In order to determine the transmit data bit Tnc corresponding to scan data areas or blocks Snac and Snbc, the simplest format, embodied in FIG. 9a, uses the elements identified in FIG. 10 as Snb(c−1)
Snbc
Snb(c+1)
Sna(c−1)
Snac
Sna(c+1)
T(n−1) (c−1)
T(n−1)c
T(n−1) (c+1)

The simplest form adds Tn(c−1) as indicated by the dashed lines in FIGS. 9a and 9b. The ROM in this case becomes a 1024×1 configuration and the next simplest form adds S(n−1)b(c−1), S(n−1)bc and S(n−1)b(c+1) as illustrated in FIGS. 11a and 11b. Other forms are possible using S(n+1)a(c−1), S(n+1)ac and S(n+1)a(c+1), as illustrated in FIGS. 12a and 12b and partial sets of the above, etc. In the case where half tones are involved, round-off error could also be used to influence the interpolation.

More specifically, in explaining the operation of the embodiment of FIG. 9a it will first be assumed that as the first two lines of a document are scanned, registers 92 and 93 are preloaded to contain a series of transmit bits corresponding to white data. Other boundary conditions on registers 91, 94 and 95 are also filled with white data. First, scanner 90 is caused to scan line 1a (FIG. 3) and its output is loaded into shaft register 91. Upon commencing the scan of line 1b the first two bits of data are to positions B and E of register 94, and at the same time the first two bits of line 1a are emptied from register 91 and are loaded into positions A and D of register 95. Simultaneously, register 92 outputs two white bits to positions C and F of register 93. At this point logic 96 receives such data and read out a corresponding transmit bit for input to the utilization means 97. This bit is also recirculated back into the input port of register 92. For each bit of scan data subsequently output by scanner 90 logic 96 will in effect examine and produce an output transmit bit for bits in the positions A and B, bits in positions D and E, bits in the positions G and H, and transmit bits in positions I, C and F, or to any combination of these depending on the manner in which the logic unit 96 is programmed.

Alternatively, by adding an additional one element (bit) delay unit 98 and another input 99 to logic unit 96, the scan data pair in positions A and B can be additionally influenced by the interpolated result (the transmit data bit J) of the immediately preceding data pair in positions G and H.

In FIGS. 11a and 11b additional shift registers 111 and 117 are added to the embodiment of FIG. 9a so as to enable the data pair in bit positions A and B (FIG. 11b) to be additionally influenced by the three scan data bits appearing at positions K, L and M in the immediately preceding scan line.

FIG. 12 illustrates the still further alternative mentioned above which permits the data bits in positions A and B to be additionally influenced by any or all of the data bits appearing in the positions N, O and P of the next scan line. In this embodiment scan data is shifted directly into register 127 as the one line (B line) delayed data is shifted out of register 122 and into register 125, and the two line delayed data is shifted out of register 121 and into register 126. This system therefore allows the interpolative decision to be made in view of all neighboring data rather than just that on three sides.

Figure 13A:
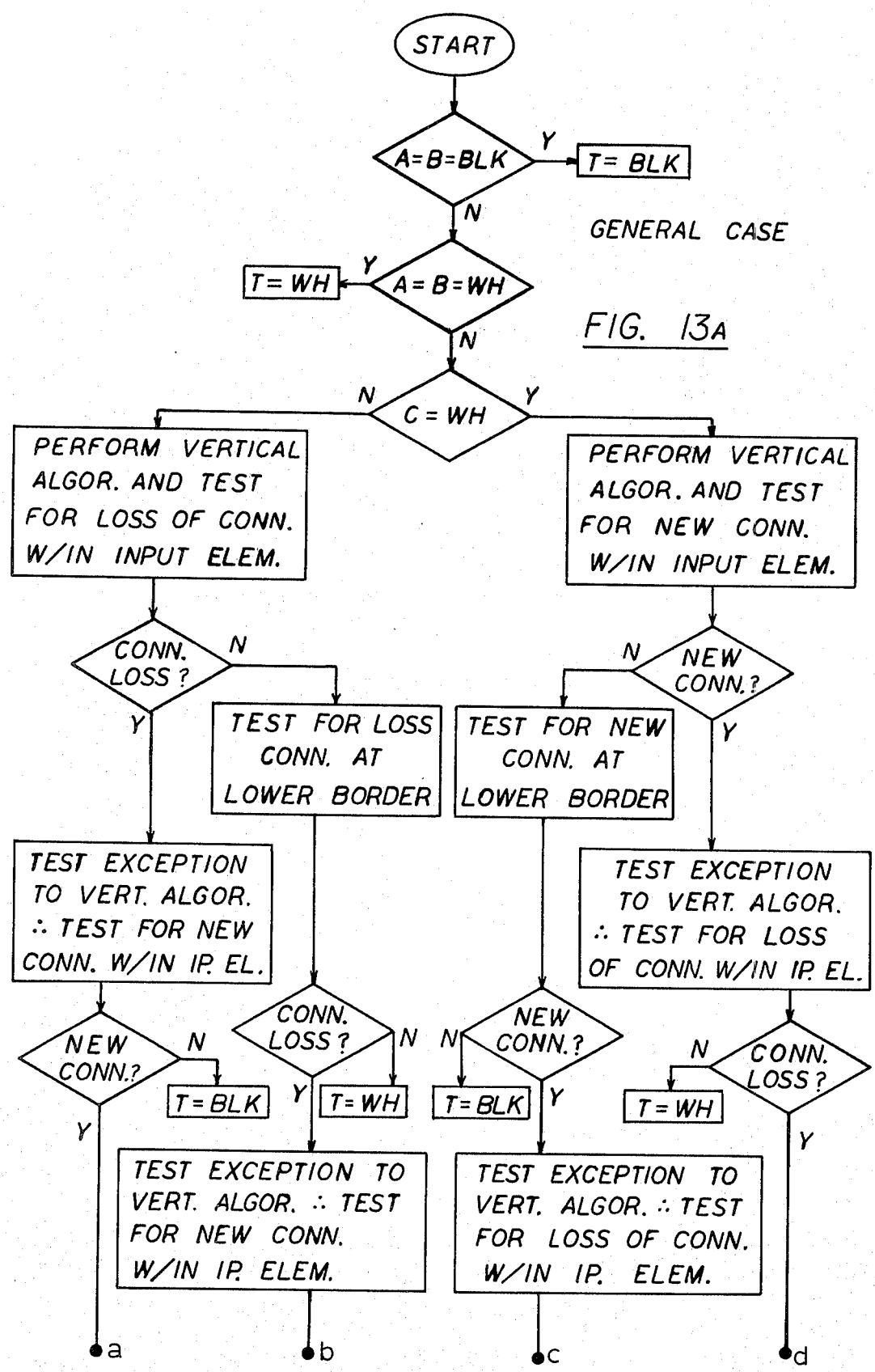
Figure 13B:
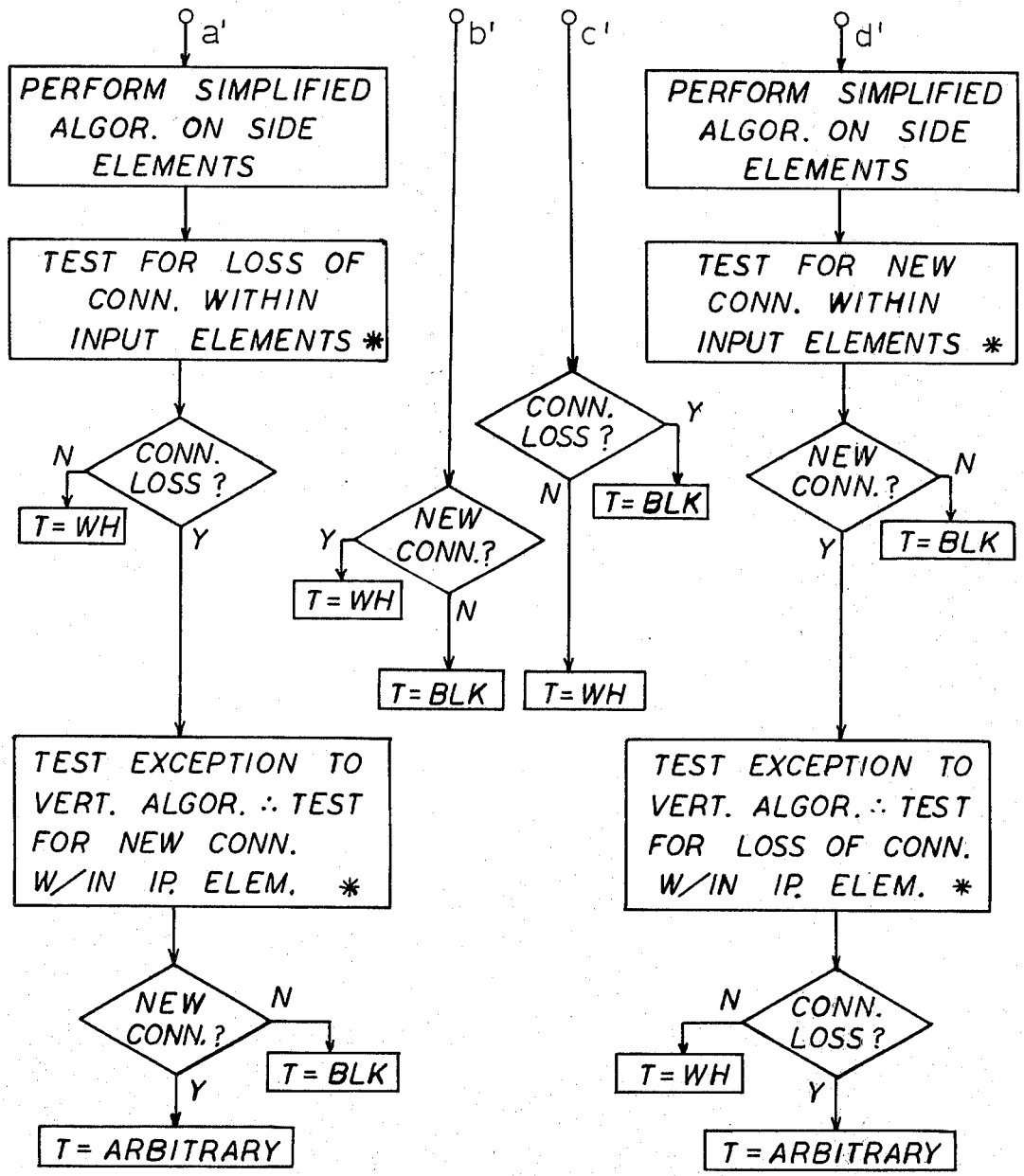
Figure 17:
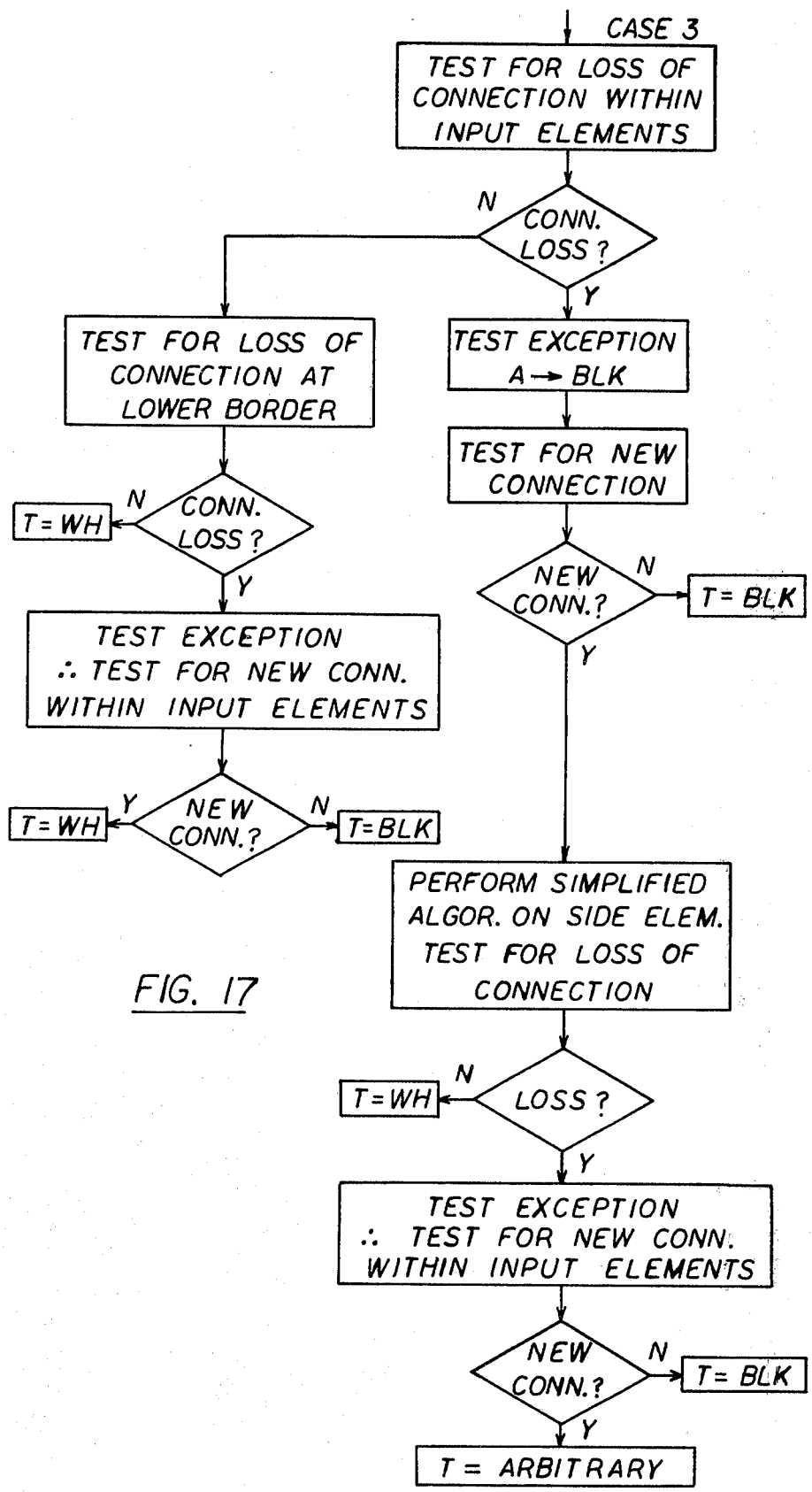
Figure 18:
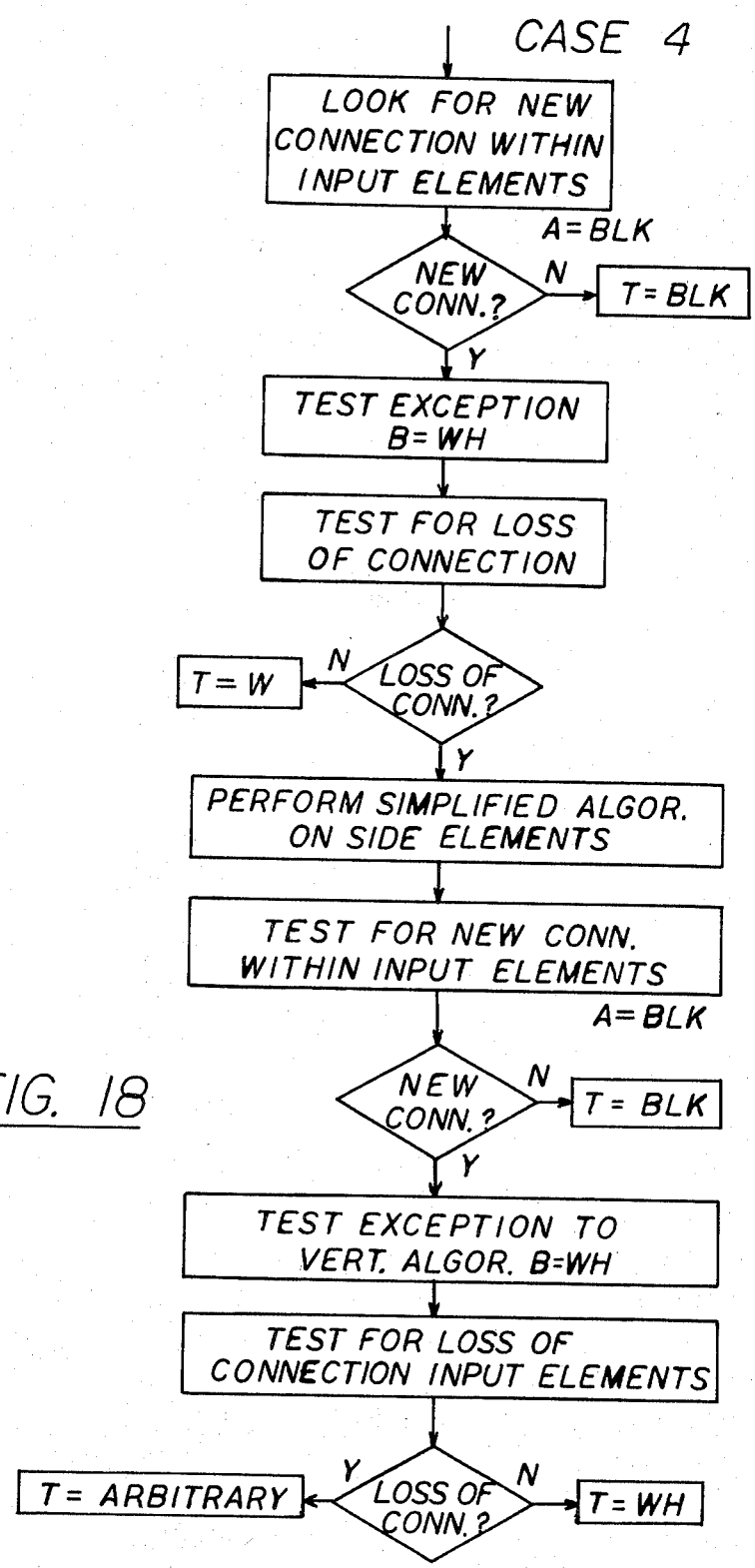

FIG. 13 is a generalized flow chart of specific algorithm development. The flow chart is used to determine the algorithm based on the particular embodiment selected through the choice of which scanned and transmitted bits, as logic input elements, are used to influence the algorithm. The flow chart in FIGS. 14, 15, 16, 17 and 18 is a special case resulting from the generalized flow chart of FIG. 13 when the specific embodiment and input structure of FIGS. 9a and 9b are selected. In view of the above discussion, it is believed that these flow charts are self-explanatory and need not be explained in detail.

Although the present invention has been described above in terms of several simplified block diagrams and illustrative examples, it is contemplated that after having read the above disclosure various alternatives and modifications thereof will become apparent to those skilled in the art. It is therefore intended that the appended claims be interpreted as covering all such alterations and modifications as fall within the true spirit and scope of the invention.

What is claimed is:

1. An interpolative data reduction system of the type used to prepare data for storage or transmission, comprising;
    an image scanning means for scanning on a line-by-line basis a document surface containing perceptible information and for generating first data signals Snac indicative of the data state of the information contained within elemental areas S distributed along a first scan line, and second data signals Snbc indicative of the data state of the information contained within elemental areas S distributed along a second scan line, where "n" indentifies a particular scan line pair, "a" and "b" respectively identify the first and second scan lines of the scan line pair, and "c" identifies the column or serial position of a particular elemental area S in the scan line;
    data storage means for receiving and storing each said first data signal Snac generated by said scanning means as it scans a first line of a scan line pair, said storage means being operative to output the stored first data signals Snac in time coincidence with second data signals Snbc generated by said scanning means as it scans the second line of said scan line pair;
    means for developing transmit signals Tnc commensurate with the signal relationship of a first data signal Snac to a corresponding second data signal Snbc and their joint relationship to a corresponding prior transmit signal T(n−1)c developed relative to a previously generated pair of data signals S(n−1)ac and S(n−1)bc; and data utilization means for receiving and utilizing said transmit signals Tnc.

2. An interpolative data reduction system as recited in claim 1 wherein each said transmit signal Tnc is defined by the algorithmic expresion $$Tnc = Snac \cdot Snbc + T(n-1)c \cdot [Snac \cdot \overline{Snbc} + \overline{Snac} \cdot Snbc]$$

where "n" is the number assigned to a particular scan line pair and corresponding transmit data line, "c" is a number assigned to the column of an elemental area pair in question, "a" designates the first scan line of the particular scan line pair and "b" designates the second scan line of the particular scan line pair.

3. An interpolative data reduction system as recited in claims 1 or 2 wherein said means for developing transmit Tnc includes a second data storage means for receiving each transmit signal Tnc and for storing each such signal for two scan line periods and then outputting each such signal as the signal T(n−1)c, and wherein said means for developing includes interpolative logic means for receiving corresponding first data signals Snac, second data signals Snbc and prior transmit signals T(n−1)c and for developing a transmit signal Tnc commensurate with said algorithmic expression.

4. An interpolative data reduction system as recited in claim 3 wherein said logic means further compares said first data signal Snac, said second data signal Snbc and said prior transmit signal T(n−1)c to another prior transmit signal T(n−1) (c−1) in developing said transmit signal Tnc.

5. An interpolative data reduction system as recited in claim 3 wherein said logic means further compares said first data signal Snac, said second data signal Snbc and said prior transmit signal T(n−1)c to a prior pair of data signals Sna(c−1) and Snb(c−1) in devloping said transmit signal Tnc.

6. An interpolative data reduction system as recited in claim 3 wherein said logic means further compares said first data signal Snac, said second data signal Snbc, and said prior transmit signal T(n−1)c to a future data signal S(n+1)a(c−1) in developing said transmit signal Tnc.

7. An interpolative data reduction system as recited in claim 3 wherein said logic means further compares said first data signal Snac, said second data signal Snbc, and said prior transmit signal T(n−1)c to a future data signal S(n+1)ac in developing said transmit signal Tnc.

8. An interpolative data reduction system as recited in claim 3 wherein said logic means further compares said first data signal Snac, said second data signal Snbc, and said prior transmit signal T(n−1)c to a future pair of data signals Sna(c+1) and Snb(c+1) and Snb(c+1) in developing said transmit signal Tnc.

9. An interpolative data reduction system as recited in claim 3 wherein said logic means further compares said first data signal Snac, said second data signal Snbc, and said prior transmit signal T(n−1)c to a future data signal S(n+1)a(c+1) in developing said transmit signal Tnc.

10. An interpolative data reduction system as recited in claim 3 wherein said logic means further compares said first data signal Snac, said second data signal Snbc, and said prior transmit signal T(n−1) to a prior data signal S(n−1)b(c−1) in developing said transmit signal Tnc.

11. An interpolative data reduction system as recited in claim 3 wherein said logic means further compares said first data signal Snac, said second data signal Snbc, and said prior transmit signal T(n−1)c to a prior data signal S(n−1)ac in developing said transmit signal Tnc.

12. An interpolative data reduction system as recited in claim 3 wherein said logic means further compares said first data signal Snac, said second data signal Snbc, and said prior transmit signal T(n−1)c to a prior data signal S(n−1)b(c+1) in developing said transmit signal Tnc.

13. An interpolative data reduction system as recited in claim 3 wherein said logic means further compares said first data signal Snac, said second data signal Snbc, and said prior transmit signal T(n−1)c to a prior transmit signal T(n−1) (c+1) in developing said transmit signal Tnc.

14. An interpolative data reduction system as recited in claim 3 wherein said logic means further compares said first data signal Snac, said second data signal Snbc, and said prior transmit signal T(n−1)c to a prior transmit signal Tn(c−1) in developing said transmit signal Tnc.

15. An interpolative data reduction system as recited in claim 4 wherein said logic means further compares said first data signal Snac, said second data signal Snbc, and said prior transmit signal T(n−1)c to a prior pair of data signals Sna(c−1) and Snb(c−1) in developing said transmit signal Tnc.

16. An interpolative data reduction system as recited in claim 15 wherein said logic means further compares said first data signal Snac, said second data signal Snbc, and said prior transmit signal T(n−1)c to a future data signal S(n+1)a(c−1) in developing said transmit signal Tnc.

17. An interpolative data reduction system as recited in claim 16 wherein said logic means further compares said first data signal Snac, said second data signal Snbc, and said prior transmit signal T(n−1)c to a future data signal S(n+1)ac in developing said transmit signal Tnc.

18. An interpolative data reduction system as recited in claim 17 wherein said logic means further compares said first data signal Snac, said second data signal Snbc, and said prior transmit signal T(n−1)c to a future pair of data signals Sna(c+1) and Snb(c+1) in developing said transmit signal Tnc.

19. An interpolative data reduction system as recited in claim 18 wherein said logic means further compares said first data signal Snac, said second data signal Snbc, and said prior transmit signal T(n−1)c to a future data signal S(n+1)a(c+1) in developing said transmit signal Tnc.

20. An interpolative data reduction system as recited in claim 19 wherein said logic means further compares said first data signal Snac, said second data signal Snbc, and said prior transmit signal T(n−1)c to a prior data signal S(n−1)b(c−1) in developing said transmit signal Tnc.

21. An interpolative data reduction system as recited in claim 20 wherein said logic means further compares said first data signal Snac, said second data signal Snbc, and said prior transmit signal T(n−1)c to a prior data signal S(n−1)ac in developing said transmit signal Tnc.

22. An interpolative data reduction system as recited in claim 21 wherein said logic means further compares said first data signal Snac, said second data signal Snbc, and said prior transmit signal $T(n-1)c$ to a prior data signal $S(n-1)b(c+1)$ in developing said transmit signal Tnc.

23. An interpolative data reduction system as recited in claim 22 wherein said logic means further compares said first data signal Snac, said second data signal Snbc, and said prior transmit signal $T(n-1)c$ to a prior transmit signal $T(n-1)(c+1)$ in developing said transmit signal Tnc.

24. An interpolative data reduction system as recited in claim 22 wherein said logic means further compares said first data signal Snac, said second data signal Snbc, and said prior transmit signal $T(n-1)c$ to a prior transmit signal $Tn(c-1)$ in developing said transmit signal Tnc.

* * * * *